United States Patent
Yamashita

(10) Patent No.: US 9,716,451 B2
(45) Date of Patent: Jul. 25, 2017

(54) SEMICONDUCTOR DEVICE, DRIVING MECHANISM AND MOTOR DRIVING CONTROL METHOD

(71) Applicant: LAPIS SEMICONDUCTOR CO., LTD., Yokohama (JP)

(72) Inventor: Takashi Yamashita, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 131 days.

(21) Appl. No.: 13/945,943

(22) Filed: Jul. 19, 2013

(65) Prior Publication Data

US 2014/0021892 A1    Jan. 23, 2014

(30) Foreign Application Priority Data

Jul. 23, 2012  (JP) .................................. 2012-162939

(51) Int. Cl.
*H02P 6/14* (2016.01)
*H02P 6/24* (2006.01)
*H02P 6/34* (2016.01)

(52) U.S. Cl.
CPC .................. *H02P 6/14* (2013.01); *H02P 6/24* (2013.01); *H02P 6/34* (2016.02)

(58) Field of Classification Search
USPC .................................. 363/56.3, 98; 318/400
See application file for complete search history.

(56) References Cited

U.S. PATENT DOCUMENTS

| | | | | |
|---|---|---|---|---|
| 5,216,587 A | * | 6/1993 | Miyazaki et al. | ......... 363/56.02 |
| 5,373,436 A | * | 12/1994 | Yamaguchi | ....... H02M 7/53803 |
| | | | | 318/811 |
| 5,874,817 A | * | 2/1999 | Yashita | ................... G11B 19/26 |
| | | | | 318/370 |
| 6,054,819 A | * | 4/2000 | Pengov | ................. H02P 25/092 |
| | | | | 318/254.2 |

(Continued)

FOREIGN PATENT DOCUMENTS

JP   06-165568    6/1994
JP   2002-165476  6/2002

(Continued)

OTHER PUBLICATIONS

Japanese Office Action dated Jun. 7, 2016.

*Primary Examiner* — Eduardo Colon Santana
*Assistant Examiner* — Devon Joseph
(74) *Attorney, Agent, or Firm* — Volentine & Whitt, PLLC

(57) ABSTRACT

A semiconductor device that controls a motor driving device. The semiconductor device includes: a position detection section that detects changes in a turning position of a rotor provided at a motor and outputs detection signals corresponding to the changing turning position; a first switching section that, in accordance with the detection signals, outputs ground switching signals, which switch which end portion of a coil is connected to a ground side, to a first switching circuit; and a second switching section that, in accordance with the detection signals, outputs connection switching signals, which switch which end portion of the coil is connected to a driving power supply side, to a third switching circuit that controls the switching of connections between the end portions of the coil and the driving power supply side by a second switching circuit.

13 Claims, 6 Drawing Sheets

(56) References Cited

U.S. PATENT DOCUMENTS

| | | | | |
|---|---|---|---|---|
| 7,126,301 B2* | 10/2006 | Nishihara | | H02P 6/182 |
| | | | | 318/400.04 |
| 7,348,740 B2* | 3/2008 | Ma | | H02P 6/16 |
| | | | | 318/254.2 |
| 7,589,485 B2 | 9/2009 | Yoshitomi et al. | | |
| 7,859,205 B2 | 12/2010 | Mori et al. | | |
| 8,610,385 B2* | 12/2013 | Sakaguchi | | H02P 6/26 |
| | | | | 318/400.1 |
| 8,618,755 B2* | 12/2013 | Maier et al. | | 318/400.04 |
| 8,963,471 B1* | 2/2015 | Neumann | | H02P 7/2805 |
| | | | | 318/294 |
| 2004/0263103 A1* | 12/2004 | Weisser | | H02P 6/34 |
| | | | | 318/400.29 |
| 2008/0203952 A1* | 8/2008 | Loibl | | H02P 23/0004 |
| | | | | 318/400.29 |
| 2009/0230906 A1* | 9/2009 | Sardat | | H03K 17/063 |
| | | | | 318/400.26 |
| 2009/0251084 A1* | 10/2009 | Haas | | F04D 27/004 |
| | | | | 318/400.11 |
| 2010/0066279 A1 | 3/2010 | Frankel et al. | | |
| 2010/0127651 A1* | 5/2010 | Ko | | H02P 6/08 |
| | | | | 318/400.26 |
| 2010/0253268 A1* | 10/2010 | Marvelly | | H02P 6/14 |
| | | | | 318/400.26 |
| 2010/0327948 A1* | 12/2010 | Nisbet | | H03K 17/687 |
| | | | | 327/436 |
| 2011/0046802 A1* | 2/2011 | Jones et al. | | 700/287 |
| 2011/0215751 A1* | 9/2011 | Sato | | 318/490 |
| 2012/0293100 A1* | 11/2012 | Aoki | | H02P 6/20 |
| | | | | 318/400.28 |
| 2013/0201773 A1* | 8/2013 | Kim | | G11C 7/22 |
| | | | | 365/189.14 |
| 2013/0221888 A1* | 8/2013 | Horikoshi | | H02P 3/22 |
| | | | | 318/400.29 |
| 2013/0229402 A1* | 9/2013 | Park | | G09G 3/32 |
| | | | | 345/212 |
| 2014/0092655 A1* | 4/2014 | Igarashi | | B60L 3/003 |
| | | | | 363/56.03 |
| 2014/0217940 A1* | 8/2014 | Kawamura | | B62D 5/0484 |
| | | | | 318/400.26 |
| 2015/0214874 A1* | 7/2015 | Wang | | H02P 6/14 |
| | | | | 318/400.26 |
| 2015/0222174 A1* | 8/2015 | Hornstein | | H03K 4/02 |
| | | | | 318/400.26 |
| 2015/0236624 A1* | 8/2015 | Yoshiya | | H02P 6/002 |
| | | | | 360/73.03 |
| 2015/0349678 A1* | 12/2015 | Aoki | | H02P 6/26 |
| | | | | 318/400.29 |

FOREIGN PATENT DOCUMENTS

| | | |
|---|---|---|
| JP | 2003-335456 | 11/2003 |
| JP | 2006237726 A | 9/2006 |
| JP | 2007-028694 | 2/2007 |
| JP | 2008236983 A | 10/2008 |
| JP | 2008259339 A | 10/2008 |

* cited by examiner

SEMICONDUCTOR DEVICE, DRIVING MECHANISM AND MOTOR DRIVING CONTROL METHOD

CROSS-REFERENCE TO RELATED APPLICATION

This application is based on and claims priority under 35 USC 119 from Japanese Patent Application No. 2012-162939 filed on Jul. 23, 2012, the disclosure of which is incorporated by reference herein.

BACKGROUND

Technical Field

The present invention relates to a semiconductor device, a driving mechanism and a motor driving control method.

Related Art

A technology is disclosed in, for example, Japanese Patent Application Laid-Open (JP-A) No. 6-165568, that controls driving of a motor using a semiconductor device such as a microcontroller or the like. In JP-A No. 6-165568, a microcontroller, a driver circuit and a position detection circuit are used to control switching elements of a driving circuit (an upper arm and a lower arm) and control turning of a brushless motor.

In JP-A No. 2002-165476, a technology is disclosed that, without using a driver circuit, controls switching elements of a driving circuit (an upper arm and a lower arm), and controls turning of a motor and controls a power supply, with only a microcontroller and a position detection circuit.

In a motor, torque and the like is controlled by a current quantity flowing in a field coil in the motor. If, for some reason, control of the current flowing in the field coil becomes impossible, a serious accident may result. Therefore, when it becomes impossible to control current flowing in a field coil, current flowing in the field coil must be cut off immediately as a safety measure.

In general, if a motor is being driven and electrification of the motor stops while the motor is turning, current remaining in the coil produces a back electromotive force and the potential of a power supply is raised. When the potential of the power supply is raised, the withstand voltages of components connected to the power supply may be exceeded and these components may be damaged.

In order to solve this problem, in driving control of a brushless motor that uses a related art microcontroller, if an overcurrent in the brushless motor is detected and should be stopped, an interrupt is inputted from a comparator detecting the current to a central processing unit (CPU). Hence, a transistor of a lower arm that controls electrification between the brushless motor and ground is turned off, and a transistor of an upper arm that controls electrification between the brushless motor and a power supply is turned on. Thus, the two ends of the coil are short-circuited and the current is regenerated, induced current remaining in the coil is discharged, the back electromotive force is suppressed, and damage to components connected to the power supply is prevented.

However, in this case, processing of the interrupt from the comparator that detects the current must be processed in software by the CPU. Consequently, there is a time lag, the back electromotive force may not be suppressed immediately, and there is a danger of damage being caused to components by the back electromotive force.

JP-A No. 2007-028694 discloses a technology relating to a technology that controls driving of a three-phase AC motor by a rotary electric machine control device constituted with an integrated circuit. If, for some reason, it becomes impossible to control current flowing in the field coil of the rotary electric machine, the current flowing in the field coil is immediately cut off as a safety measure. Specifically, when it becomes impossible to control the current flowing in the field coil of the rotary electric machine for some reason, a PMOS transistor and an NMOS transistor that are connected in series with the field coil are cut off by control from the microcontroller.

Further still, JP-A No. 2003-335456 discloses a technology in which the value of a current flowing in a motor is compared with a pre-specified target current value by a comparator. If the value of the current flowing in the motor exceeds the target current value, control signals from a CPU are cut off and signals for controlling the value of current flowing in the motor are outputted directly to a driving circuit. Thus, when current changes are large reversals or the like, changes in current value relative to the target current value are suppressed.

SUMMARY

A first aspect of the present disclosure is a semiconductor device that controls a motor driving device. The motor driving device includes: a first switching circuit that switches which of end portions of a coil provided at a motor is connected to a ground side; and a second switching circuit that switches which of the end portions of the coil is connected to a driving power supply side. The motor driving device controls current flowing in the coil with the first switching circuit and the second switching circuit. The semiconductor device includes: a position detection section that detects changes in a turning position of a rotor provided at the motor and outputs detection signals corresponding to the changing turning position; a first switching section that, in accordance with the detection signals, outputs ground switching signals, which switch which end portion of the coil is connected to the ground side, to the first switching circuit; and a second switching section that, in accordance with the detection signals, outputs connection switching signals, which switch which end portion of the coil is connected to the driving power supply side, to a third switching circuit that controls the switching of connections between the end portions of the coil and the driving power supply side by the second switching circuit.

A second aspect of the present disclosure is a driving mechanism that includes: a semiconductor device; a motor driving device including a first switching circuit that switches which of end portions of a coil provided at a motor is connected to a ground side and a second switching circuit that switches which of the end portions of the coil is connected to a driving power supply side, the motor driving device controlling current flowing in the coil with the first switching circuit and the second switching circuit; a third switching circuit; and the motor, wherein the semiconductor device controls the motor driving device, and the semiconductor device includes: a position detection section that detects changes in a turning position of a rotor provided at the motor and outputs detection signals corresponding to the changing turning position; a first switching section that, in accordance with the detection signals, outputs ground switching signals, which switch which end portion of the coil is connected to the ground side, to the first switching circuit; and a second switching section that, in accordance with the detection signals, outputs connection switching signals, which switch which end portion of the coil is connected to the driving power supply side, to the third switching circuit, which controls the switching of connections between the end portions of the coil and the driving power supply side by the second switching circuit.

A third aspect of the present disclosure is a motor driving control method at a semiconductor device that controls a motor driving device. The motor driving device includes: a first switching circuit that switches which of end portions of a coil provided at a motor is connected to a ground side; and a second switching circuit that switches which of the end portions of the coil is connected to a driving power supply side, the motor driving device controlling current flowing in the coil with the first switching circuit and the second switching circuit. The motor driving control method includes: detecting changes in a turning position of a rotor provided at the motor and outputting detection signals corresponding to the changing turning position; in accordance with the detection signals, outputting ground switching signals, which switch which end portion of the coil is connected to the ground side, to the first switching circuit; and in accordance with the detection signals, outputting connection switching signals, which switch which end portion of the coil is connected to the driving power supply side, to a third switching circuit that controls the switching of connections between the end portions of the coil and the driving power supply side by the second switching circuit.

DETAILED DESCRIPTION

Figure 1:
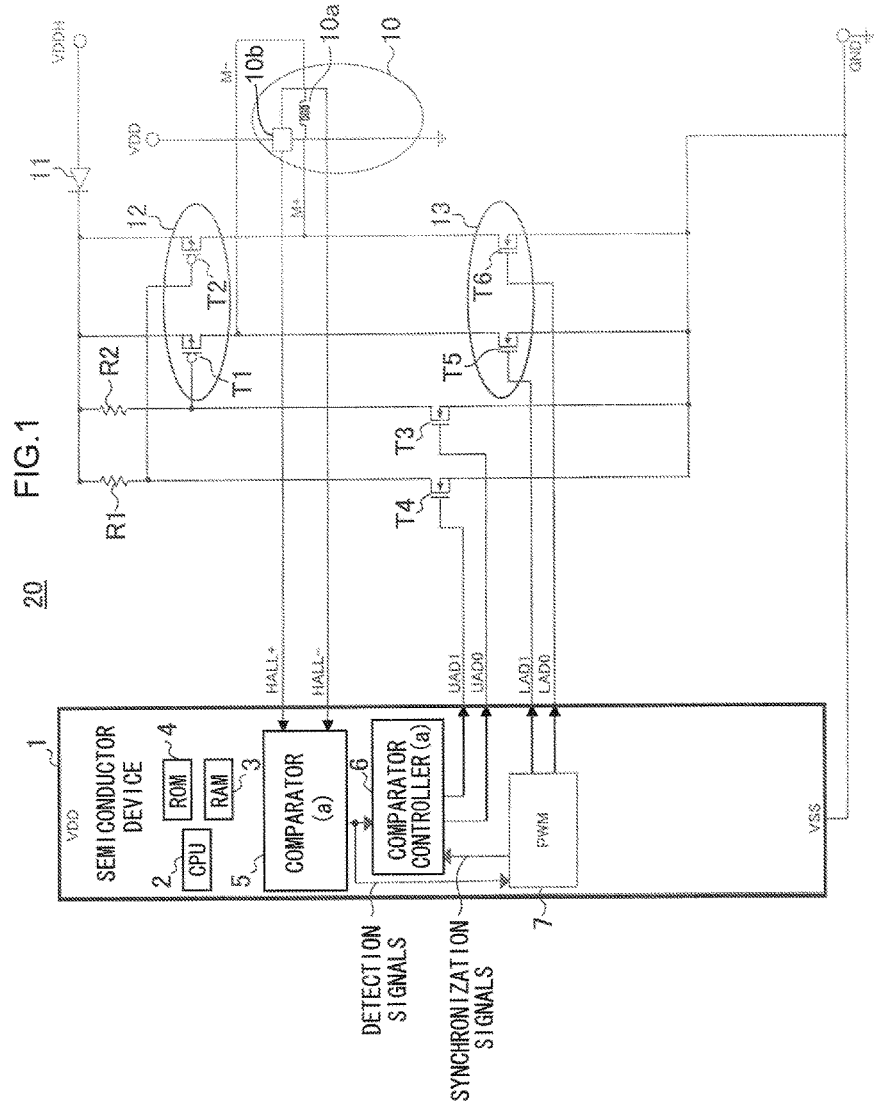
FIG. 1 is a circuit diagram showing a structural example of a semiconductor device in accordance with an exemplary embodiment and a structural example of a driving mechanism equipped with this semiconductor device.

Herebelow, an exemplary embodiment of the present invention is described using the attached drawings. FIG. 1 shows the structure of a driving mechanism 20 that is equipped with a semiconductor device 1 (which is referred to hereinafter as a microcontroller) in accordance with a present exemplary embodiment (a first exemplary embodiment). The semiconductor device 1 (a one-chip microcontroller) is structured on one chip with a CPU 2, a random access memory (RAM) 3 and a read-only memory (ROM) 4, and with a comparator (a) 5, a comparator controller (a) 6 and a pulse width modulator (PWM) 7. The CPU 2 carries out various kinds of processing including driving control of a motor 10 provided at the driving mechanism 20, in accordance with the execution of programs. The RAM 3 is used as a work area when various programs are being executed by the CPU 2 and the like. The ROM 4 is a recording medium in which various processing control programs, various parameters and the like are memorized in advance. The comparator (a) 5 is formed of an analog circuit and serves as a position detection section according to the present invention. The comparator controller (a) 6 is formed of a logic circuit and serves as a second switching section according to the present invention. The PWM 7 outputs pulse width modulation (PWM) pulses and serves as a first switching section according to the present invention.

In the present exemplary embodiment (a first exemplary embodiment), as an example, the semiconductor device 1 is driven at 5.0 V DC and a motor 10 that is the target of control is driven at 12.0 V DC. In the present exemplary embodiment, the motor 10 is a single-phase brushless motor.

The driving mechanism 20 is equipped both with the semiconductor device 1 and the motor 10 and with an upper arm 12 and a lower arm 13. The upper arm 12 is provided with PMOS transistors T1 and T2, and serves as a second switching circuit according to the present invention. The lower arm 13 is provided with NMOS transistors T5 and T6, and serves as a first switching circuit according to the present invention. A coil 10a and a Hall effect device 10b are provided in the motor 10. The Hall effect device 10b detects changes in rotation of the motor 10. In this motor 10, the coil 10a is fixed, and the motor 10 is turned by magnetic force generated by current flowing in the coil 100a and magnetic force from a magnet or the like provided at a rotor of the motor 10.

The respective drains of the PMOS transistors T1 and T2 provided in the upper arm 12 are connected, via a diode 11, to a driving power supply VDDH (12.0 V DC) that is for driving the motor 10. The supply of the PMOS transistor T1 is connected to an end portion M− of the coil 10a in the motor 10 and to the drain of the NMOS transistor 15 provided in the lower arm 13. The source of the PMOS transistor T2 is connected to an other end portion M+ of the coil 10a in the motor 10 and to the drain of the NMOS transistor T6 provided in the lower arm 13.

The gate of the PMOS transistor T1 is connected to the driving power supply VDDH via a resistance R2 and the diode 11, is connected to the drain of an NMOS transistor T3, which serves as a third switching circuit according to the present invention, and is connected to ground GND via this NMOS transistor T3. The gate of the PMOS transistor T2 is connected to the driving power supply VDDH via a resistance R1 and the diode 11, is connected to the drain of an NMOS transistor T4, which is also the third switching circuit according to the present invention, and is connected to the ground GND via this NMOS transistor 14.

That is, the drain of the NMOS transistor T3 is connected to the gate of the PMOS transistor T1 and the source of the NMOS transistor T3 is connected to the ground GND, and the drain of the NMOS transistor T4 is connected to the gate of the PMOS transistor T2 and the source of the NMOS transistor T4 is connected to the ground GND. The gate of the NMOS transistor T3 is connected to an output terminal of the comparator controller (a) 6 of the semiconductor device 1, and the NMOS transistor T3 is controlled to turn on and off by a signal UAD0 outputted from the comparator controller (a) 6. The gate of the NMOS transistor T4 is connected to another output terminal of the comparator controller (a) 6 of the semiconductor device 1, and the NMOS transistor T4 is controlled to turn on and off by a signal UAD1 outputted from the comparator controller (a) 6.

The drain of the NMOS transistor T5 provided in the lower arm 13 is connected to the source of the PMOS transistor T1 provided in the upper arm 12 and to the end portion M− of the coil 10a in the motor 10, and the source of the NMOS transistor T5 is connected to the ground GND.

Similarly, the drain of the NMOS transistor T6 provided in the lower arm 13 is connected to the source of the PMOS transistor T2 provided in the upper arm 12 and to the end portion M+ of the coil 10a in the motor 10, and the source of the NMOS transistor T6 is connected to the ground GND.

The gate of the NMOS transistor T5 provided in the lower arm 13 is connected to an output terminal of the PWM 7 of the semiconductor device 1, and the NMOS transistor T5 is controlled to turn on and off by a signal LAD1 outputted from the PWM 7. The gate of the NMOS transistor T6 provided in the lower arm 13 is connected to another output terminal of the PWM 7 of the semiconductor device 1, and the NMOS transistor T6 is controlled to turn on and oil by a signal LAD0 outputted from the PWM 7.

In practice, diodes are connected between the respective drains and sources of the PMOS transistors T1 and T2 and the NMOS transistors T3 to T6.

The comparator (a) 5 corresponds to a position detection section of the present invention. The comparator (a) 5 inputs position detection signals HALL+ and HALL− that are outputted from the Hall effect device 10b, detects changes in turning positions of the rotor provided at the motor 10, and outputs detection signals corresponding to the changing rotary positions.

The lower arm 13 corresponds to the first switching circuit of the present invention, and the PWM 7 corresponds to the first switching section of the present invention. In accordance with the detection signals outputted from the comparator (a) 5 serving as the position detection section, the PWM 7 outputs the signals LAD0 and LAD1, which serve as first switching signals, for controlling the lower arm 13 so as to switch which of the end portions M+ and M− of the coil 10a of the motor 10 is connected to the ground GND.

The upper arm 12 corresponds to the second switching circuit of the present invention, and the comparator controller (a) 6 corresponds to the second switching section of the present invention. In accordance with the detection signals outputted from the comparator (a) 5 serving as the position detection section, the comparator controller (a) 6 outputs the signals UAD0 and UAD1, which serve as second switching signals, for controlling the upper arm 12 so as to switch which of the end portions M+ and M− of the coil 10a of the motor 10 is connected to the driving power supply VDDH.

Thus, connections from the end portions M+ and M− of the coil 10a of the motor 10 are switched between the driving power supply VDDH and ground GND by the upper arm 12 and the lower arm 13 on the basis of the detection signals outputted from the comparator (a) 5. Thus, the direction of a current flowing in the coil 10a of the motor 10 is switched, and the motor 10 is controlled so as to turn in one direction.

For example, when the position detection signal HALL+ outputted from the Hall effect device 10b changes to low (L) and the signal HALL− changes to high (H), the output of the comparator (a) 5 goes to low (L), and when the position detection signal HALL+ outputted from the Hall effect device 10b changes to high and the signal HALL− changes to low, the output of the comparator (a) 5 goes to high. The output from the comparator (a) 5 is inputted to the PWM 7 and to the comparator controller (a) 6.

When the output from the comparator (a) 5 changes from high to low or from low to high, the operation state of the PWM 7 goes into a stopped state and waits for the input of a start signal from the CPU 2.

The CPU 2 applies control such that the output of the signals LAD0 and LAD1 from the PWM 7 is delayed for a pre-specified duration after the output from the comparator (a) 5 has changed. That is, a dead time is specified at the CPU 2 in order to avoid problems that would occur if the upper arm 12 and the lower arm 13 were turned on at the same time.

For example, when the output from the comparator (a) 5 changes from high to low and the dead time specified by the CPU 2 has passed, the PWM 7 is put into an operating state, and the signal LAD0 is set to high. The PWM 7 outputs PWM pulses. The turning speed of the motor 10 is controlled according to the width of the pulses.

In the present exemplary embodiment, in the state in which the PWM 7 is not operating, the comparator controller (a) 6 sets the signal UAD1 to low and sets the signal UAD0 to low, regardless of outputs from the comparator (a) 5.

When the PWM 7 goes into an operating state, the comparator controller (a) 6 switches the signal UAD1 or the signal UAD0.

For example, when the output of the comparator (a) 5 changes from high to low and the PWM 7 goes into the operating state, the comparator controller (a) 6 sets the signal UAD0 to high.

Accordingly, when the signal UAD0 from the comparator controller (a) 6 goes to high, the NMOS transistor T3 turns on and the PMOS transistor T1 turns on. In this state, the signal UAD1 from the comparator controller (a) 6 is low, so the NMOS transistor T4 is turned off and the PMOS transistor T2 is turned off.

Furthermore, in this state the signal LAD1 outputted from the PWM 7 is low, so the NMOS transistor T5 is turned off, and the signal LAD0 outputted from the PWM 7 is high, so the NMOS transistor T6 is turned on.

As a result, the end portion M− of the coil 10a of the motor 10 is connected to the driving power supply VDDH via the PMOS transistor T1 and the diode 11, and the end portion M+ of the coil 10a of the motor 10 is connected to the ground GND via the NMOS transistor T6. Thus, the motor 10 turns. This turning is rotation in a forward direction.

When the motor 10 is turning in the forward direction in this manner and reaches a predetermined turning angle, which is a position at which the relationship between the magnetic poles of a magnet provided at the rotor of the motor 10 and the magnetic poles of magnetism generated by the coil 10a will retard the turning of the motor 10, the position detection signal HALL+ outputted from the Hall effect device 10b changes to high and the signal HALL− changes to low. At this time, the output of the comparator (a) 5 goes to high, and this high output from the comparator (a) 5 is inputted to the PWM 7 and the comparator controller (a) 6.

When the output from the comparator (a) 5 changes from low to high, the PWM 7 immediately sets the signal LAD0 to low, and after the dead time has passed, sets the signal LAD to high, outputting a PWM pulse.

When the output from the comparator (a) 5 changes from low to high, the comparator controller (a) 6 immediately sets the signal UAD0 to low and thereafter, in response to the start of operation of the PWM 7, sets the signal UAD1 to high.

Accordingly, when the signal UAD1 from the comparator controller (a) 6 goes to high, the NMOS transistor 1T4 turns on and the PMOS transistor T2 turns on. In this state, the signal UAD0 from the comparator controller (a) 6 is low, so the NMOS transistor T3 is off and the PMOS transistor T1 is off.

Furthermore, in this state the signal LAD1 outputted from the PWM 7 is high, so the NMOS transistor T5 is turned on, and the signal LAD0 outputted from the PWM 7 is low, so the NMOS transistor T6 is turned off.

As a result, the end portion M+ of the coil 10a of the motor 10 is connected to the driving power supply VDDH via the PMOS transistor T2 and the diode 11, the end portion M− of the coil 10a of the motor 10 is connected to the ground GND via the NMOS transistor T5, the direction of the current flowing in the coil 10a switches to the opposite direction from the previous direction, and the magnetic poles of the magnetism generated by the coil 10a are reversed. Hence, the motor 10 continues to turn in the forward direction.

When the motor 10 is turning in the forward direction in this manner and reaches a predetermined turning angle, the position detection signal HALL+ outputted from the Hall effect device 10b changes back to low and the signal HALL− changes back to high, the output of the comparator (a) 5 goes to low, and the motor 10 continues to turn in the forward direction.

That is, in the present exemplary embodiment, the PMOS transistors T1 and T2 are provided at the upper arm 12 that is provided for controlling connections to the driving power supply VDDH (12.0 V DC), switching the connection between the end portions M+ and M− of the coil 10a of the motor 10, and the PMOS transistors T1 and T2 are controlled to be turned on and off via the NMOS transistors T3 and T14. Thus, driving of the motor 10 that is driven at 12.0 V DC may be controlled by the semiconductor device 1 that is a microcontroller driven at 5.0 V DC.

Figure 2:
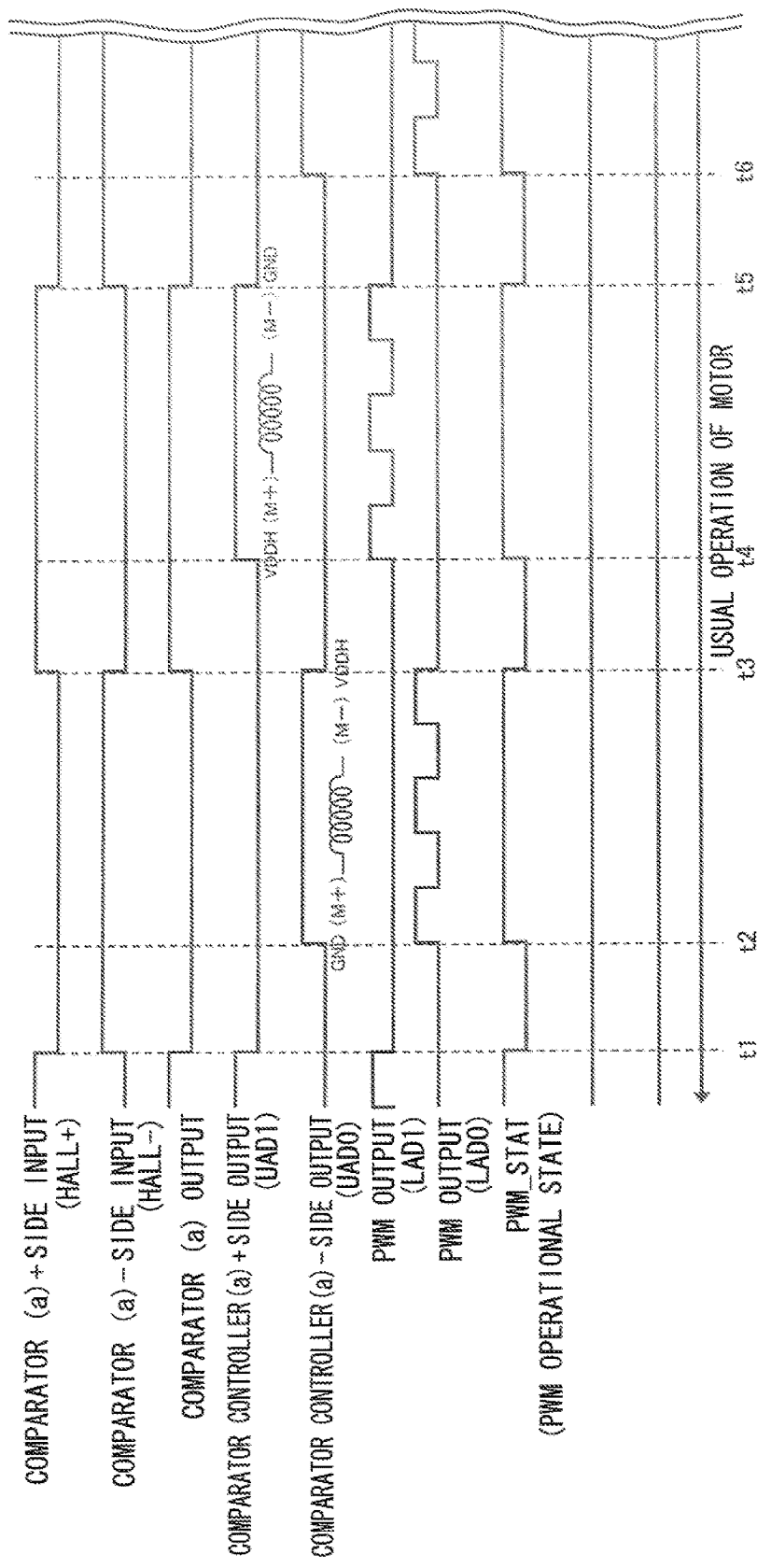
FIG. 2 is a timing chart showing an example of operation of the semiconductor device of FIG. 1.

The operation of this semiconductor device 1 according to the present exemplary embodiment is now described using the timing chart in FIG. 2. When the semiconductor device 1 is started up, the comparator controller (a) 6 is started up by the CPU 2, and the comparator (a) 5 is started up by the comparator controller (a) 6.

At the timing t1, the position detection signal HALL+ outputted from the Hall effect device 10b changes to low and the signal HALL− changes to high, and the output of the comparator (a) 5 goes to low.

The output from the comparator (a) 5 is inputted to the PWM 7 and the comparator controller (a) 6. When the output from the comparator (a) 5 changes from high to low, the operating state of the PWM 7 goes into the stopped state, the signal LAD1 is immediately set to low, and the dead time is set and a start signal inputted from the CPU 2. The comparator controller (a) 6 sets the signal UAD1 to low immediately.

At the timing t2, the dead time of the PWM 7 has passed, the PWM 7 goes into an operating state, and the signal LAD0 (PWM pulses) is outputted. When the PWM 7 goes into the operating state, the comparator controller (a) 6 sets the signal UAD0 to high.

Thus, when the signal LAD0 (PWM pulses) is outputted from the PWM 7 and the signal UAD0 from the comparator controller (a) 6 goes high, as described above, the motor 10 turns in the forward direction.

At the timing t3, the motor 10 turning in the forward direction has turned to the predetermined turning angle, the position detection signal HALL+ outputted from the Fall effect device 10b changes to high and the signal HALL− changes to low, and the output of the comparator (a) 5 goes to high.

The output from the comparator (a) 5 is inputted to the PWM 7 and the comparator controller (a) 6. When the output from the comparator (a) 5 changes from low to high, the operating state of the PWM 7 goes into the stopped state, the signal LAD0 is immediately set to low, and the dead time is set and a start signal inputted from the CPU 2. The comparator controller (a) 6 sets the signal UAD0 to low immediately.

At the timing t4, the dead time of the PWM 7 has passed, the PWM 7 sets the signal LAD1 to high, outputting PWM pulses, and the comparator controller (a) 6 sets the signal UAD1 to high.

Thus, when the signal LAD1 (PWM pulses) is outputted from the PWM 7 and the signal UAD1 from the comparator controller (a) 6 goes high, as described above, the direction of the current flowing in the coil 10a of the motor 10 changes and the motor 10 continues to turn in the forward direction.

At the timing t5, the motor 10 continuing to turn in the forward direction has turned to the predetermined turning angle, the position detection signal HALL+ outputted from the Hall effect device 10b changes to low and the signal HALL− changes to high, the output of the comparator (a) 5 goes low, and operations are the same as at the timing t1. At the timing t6, operations are the same as at the timing t2, and these same operations are repeated thereafter.

Figure 3:
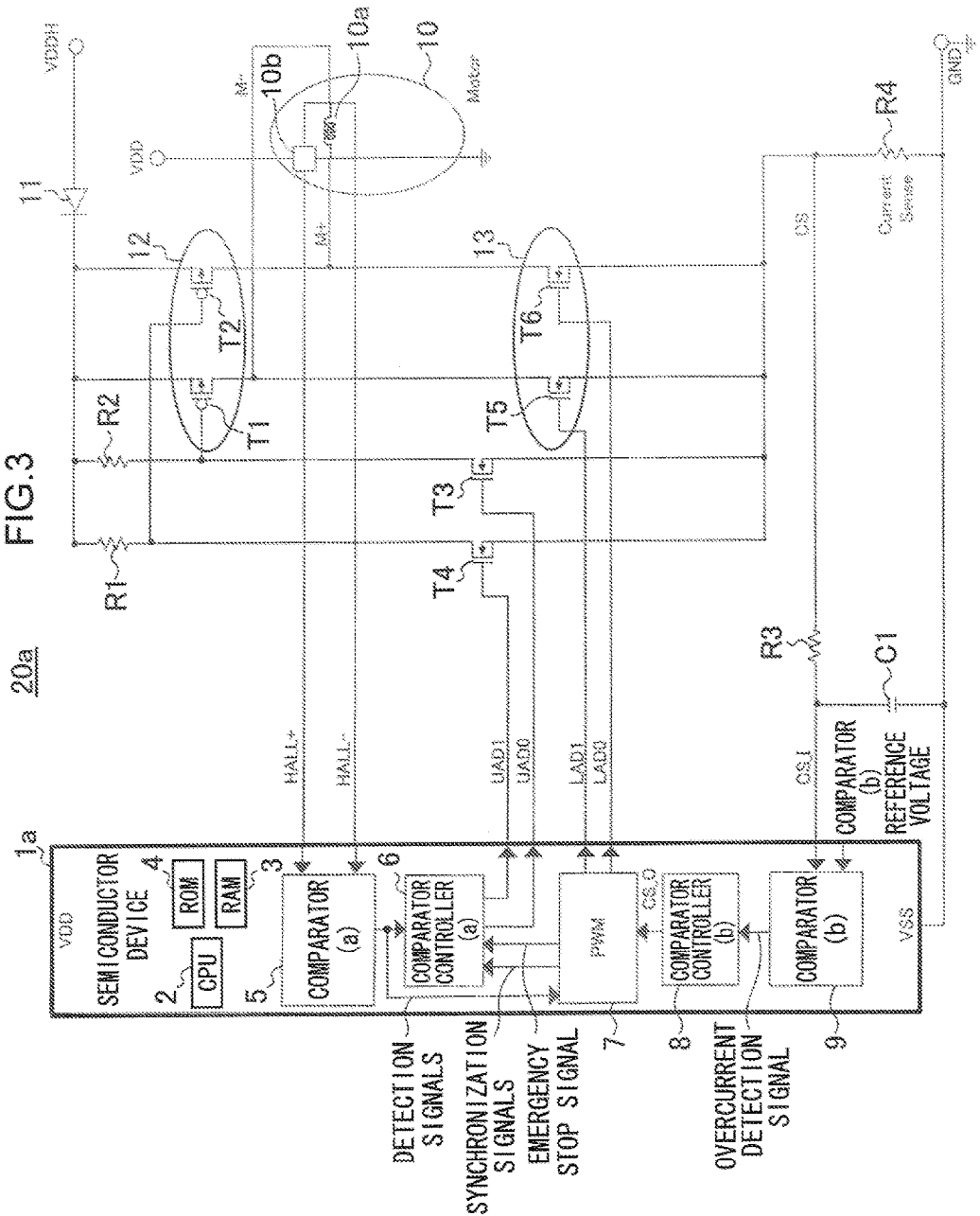
FIG. 3 is a circuit diagram showing another structural example of the semiconductor device in accordance with an exemplary embodiment and a structural example of a driving mechanism equipped with this semiconductor device.
Figure 4:
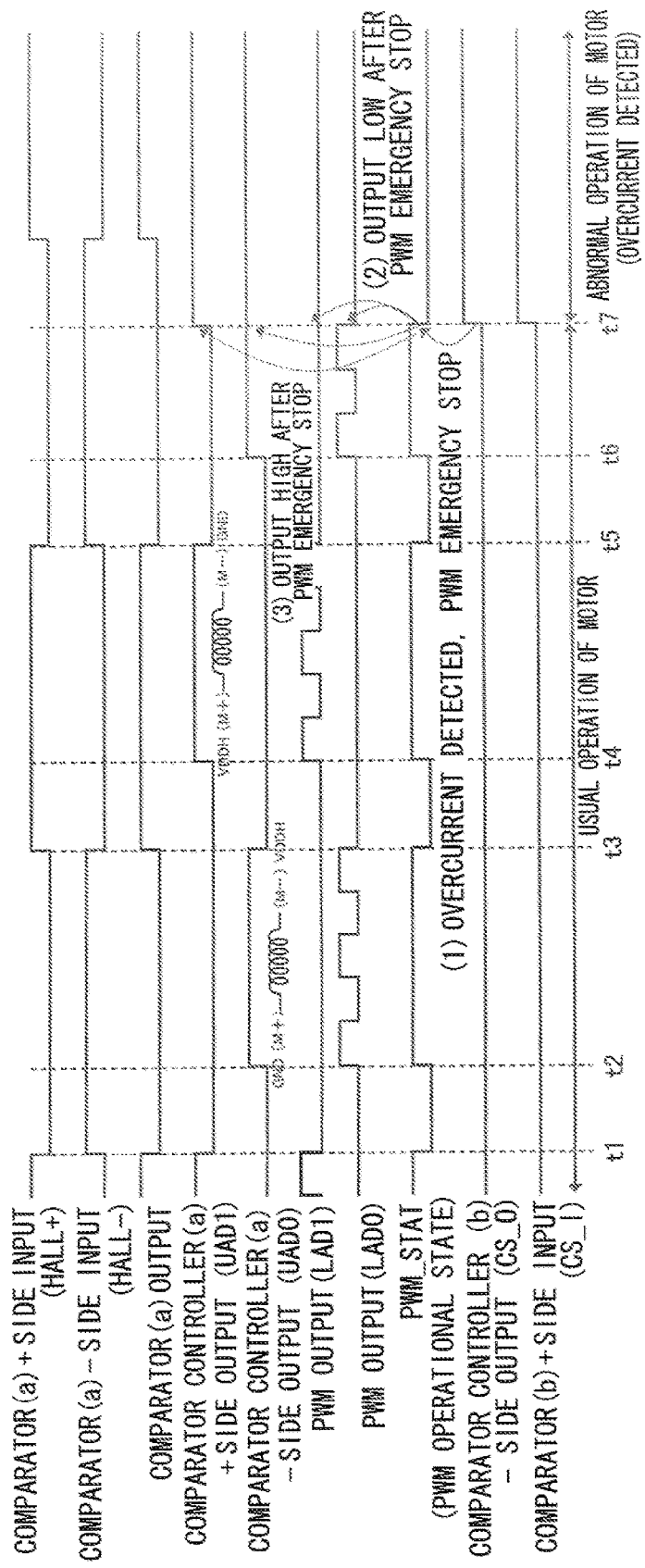
FIG. 4 is a timing chart showing an example of operation of the semiconductor device of FIG. 3.
Figure 5:
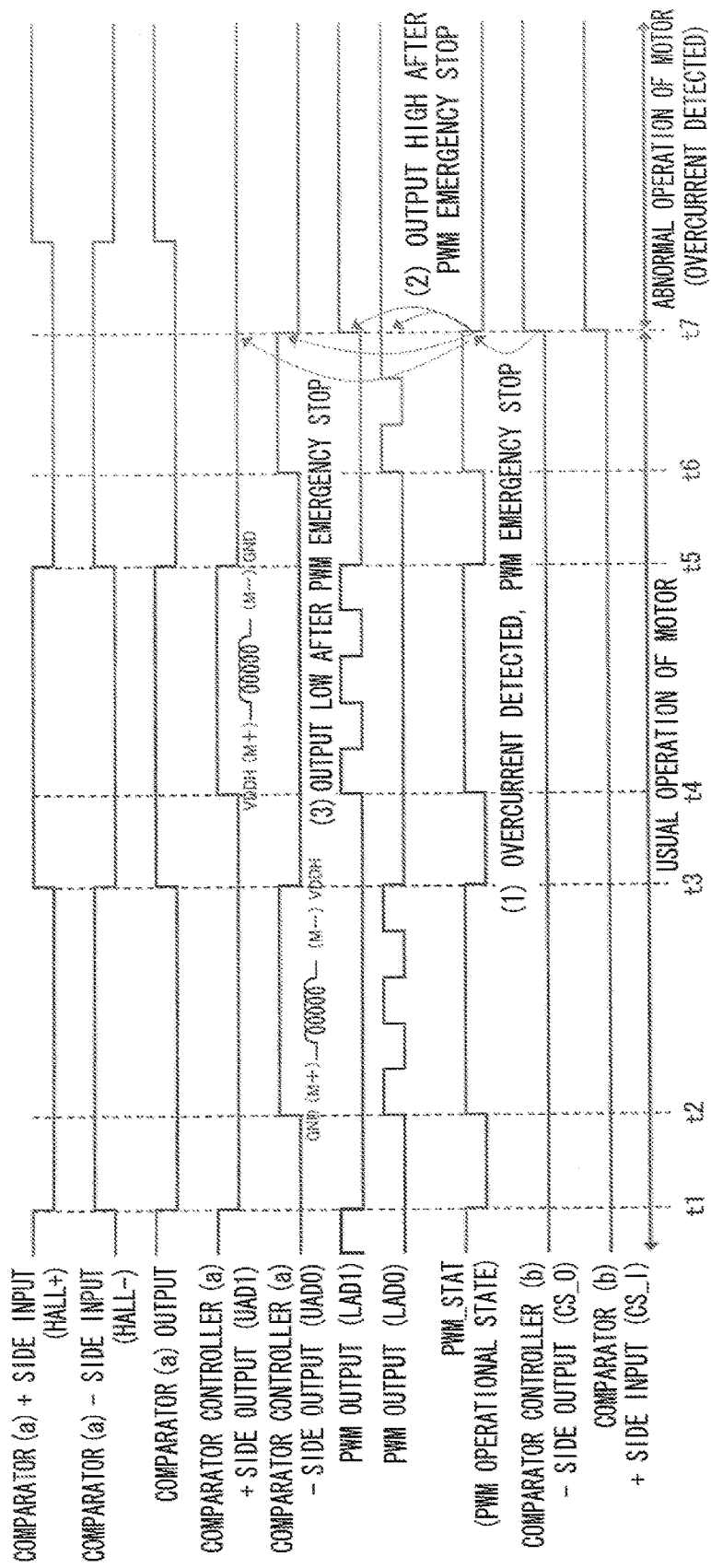
FIG. 5 is a timing chart showing another example of operation of the semiconductor device of FIG. 3.

Now, another exemplary embodiment (a second exemplary embodiment) is described using FIG. 3, FIG. 4 and FIG. 5.

A driving mechanism 20a shown in FIG. 3 has a structure in which resistances R3 and R4 and a capacitor C1 are added to the driving mechanism 20 shown in FIG. 1, and in a semiconductor device 1a, a logic circuit comparator controller (b) 8 and an analog circuit comparator (b) 9 are added to the semiconductor device 1.

Structures other than the resistances R3 and R4 and capacitor C1 and the comparator controller (b) 8 and comparator (b) 9 in the semiconductor device 1a are the same as in the driving mechanism 20 in FIG. 1, and operations thereof are not described here.

The resistance R4 is connected between the respective sources of the NMOS transistors T3 to T6 and the ground GND. Current values flowing in the resistance R4, that is, current values flowing in the motor 10, are measured by the resistance R3 and the capacitor C1.

The comparator controller (b) 8 corresponds to an emergency stop section of the present invention, and the comparator (b) 9 corresponds to an overcurrent detection section of the present invention.

In this structure, the current values flowing in the motor 10 that are measured by the resistance R3 and capacitor C1 are inputted to the comparator (b) 9. The comparator (b) 9 compares the inputted current values (CS_I) with a pre-specified reference value. When a current with an abnormal value exceeding the reference value (an overcurrent) flows in the motor 10, the comparator (b) 9 outputs an overcurrent detection signal. In this case, the current value is converted to a voltage value, inputted to the comparator (b) 9, and compared with a reference voltage at the comparator (b) 9.

The overcurrent detection signal outputted from the comparator (b) 9 is inputted to the comparator controller (b) 8, and the comparator controller (b) 8 outputs an emergency stop signal CS_O to the PWM 7 and the comparator controller (a) 6, so as to urgently stop the turning of the motor 10.

In the present exemplary embodiment, the comparator controller (b) 8 outputs signals that control the PWM 7 and the comparator controller (a) 6 so as to short-circuit (connect together) the two ends of the coil 10a, so as to stop electrification of the coil 10a of the motor 10 and regenerate current remaining in the coil 10a.

For example, the comparator controller (b) 8 outputs a cut-off signal to the PWM 7 to control the lower arm 13 and cut off the connection between the ground GND and the coil 10a, and the comparator controller (b) 8 outputs a short-circuit signal to the comparator controller (a) 6 to control the upper arm 12, connect the two ends of the coil 10a to the driving power supply VDDH and short-circuit the coil 10a.

Alternatively, the comparator controller (b) 8 outputs the cut-off signal to the comparator controller (a) 6 to control the upper arm 12 and cut off the connection between the driving power supply VDDH and the coil 10a, and the comparator controller (b) 8 outputs the short-circuit signal to the PWM 7 to control the lower arm 13, connect the two ends of the coil 10a to ground and short-circuit the coil 10a.

Thus, effects are provided in that a back electromotive force that is generated when electrification of the motor 10 is stopped during rotation of the motor 10 may be suppressed, and hence exceeding of withstand voltages at components connected to a power supply (the driving power supply VDDH) may be prevented, and damage to the components may be prevented.

Operation of this semiconductor device 1a according to the present exemplary embodiment is now described using the timing charts in FIG. 4 and FIG. 5. The operations at timings t1 to t6 are the same as those described with FIG. 2, and are not described here.

First, an operational example in which the two ends of the coil 10a are connected and short-circuited at the upper arm 12 side is described using FIG. 4. At the timing t7 in FIG. 4, the comparator (b) 9 detects that an overcurrent is flowing in the motor 10 (the coil 10a), and the comparator (b) 9 outputs the overcurrent detection signal (high).

When the comparator (b) 9 outputs the overcurrent detection signal (high), the comparator controller (b) 8 outputs the emergency stop signal CS_O to the PWM 7, and operation of the PWM 7 is immediately emergency-stopped.

When the PWM 7 inputs the emergency stop signal CS_O from the comparator controller (b) 8, operation of the PWM 7 stops (PWM_STAT goes low), and the output signals LAD0 and LAD1 are both set to low.

When the PWM 7 emergency-stops and PWM_STAT goes low, the emergency stop signal is inputted from the PWM 7 to the comparator controller (a) 6, and the comparator controller (a) 6 sets both the output signals UAD0 and UAD1 to high.

Thus, when the output signals UAD0 and UAD1 from the comparator controller (a) 6 both go high, the NMOS transistors T3 and T4 in FIG. 3 are both turned on, so the PMOS transistors T1 and T2 provided at the upper arm 12 are both turned on. Meanwhile, the output signals LAD0 and LAD1 from the PWM 7 are both low, so the NMOS transistors T5 and T6 provided at the lower arm 13 in FIG. 3 are both turned off.

As a result, the two end portions M+ and M− of the coil 10a of the motor 10 are short-circuited via the PMOS transistors T1 and T2, and the current remaining in the coil 10a is regenerated. Thus, a current may be regenerated and a back electromotive force suppressed without a time lag.

Next, an operational example in which the two ends of the coil 10a are connected and short-circuited at the lower arm 13 side is described using FIG. 5. At the timing t7 in FIG. 5, the comparator (b) 9 detects that an overcurrent is flowing in the motor 10 (the coil 10a), and the comparator (b) 9 outputs the overcurrent detection signal (high).

When the comparator (b) 9 outputs the overcurrent detection signal (high), the comparator controller (b) 8 outputs the emergency stop signal CS_O to the PWM 7, and operation of the PWM 7 is immediately emergency-stopped.

When the PWM 7 inputs the emergency stop signal CS_O from the comparator controller (b) 8, operation of the PWM 7 stops (PWM_STAT goes low), and the output signals LAD0 and LAD1 are both set to high.

When the PWM 7 emergency-stops, PWM_STAT goes low and the emergency stop signal is inputted from the PWM 7 to the comparator controller (a) 6, the comparator controller (a) 6 sets both the output signals UAD0 and UAD1 to low.

Thus, when the output signals UAD0 and UAD1 from the PWM 7 both go low, the NMOS transistors T3 and T4 in FIG. 3 are both turned off, so the PMOS transistors T1 and T2 provided at the upper arm 12 are both turned off. Meanwhile, the output signals LAD0 and LAD1 from the PWM 7 are both high, so the NMOS transistors T5 and T6 provided at the lower arm 13 in FIG. 3 are both turned on.

As a result, the two end portions M+ and M− of the coil 10a of the motor 10 are short-circuited via the NMOS transistors T5 and T6, and the current remaining in the coil 10a is regenerated. Thus, a current may be regenerated and a back electromotive force suppressed without a time lag.

In the emergency stop operations described with FIG. 4 and FIG. 5, when the PWM 7 emergency-stops, an emergency stop flag is set to high. This emergency stop flag may be cleared by a register write by the CPU 2, and usual operations are resumed after this write.

Figure 6:
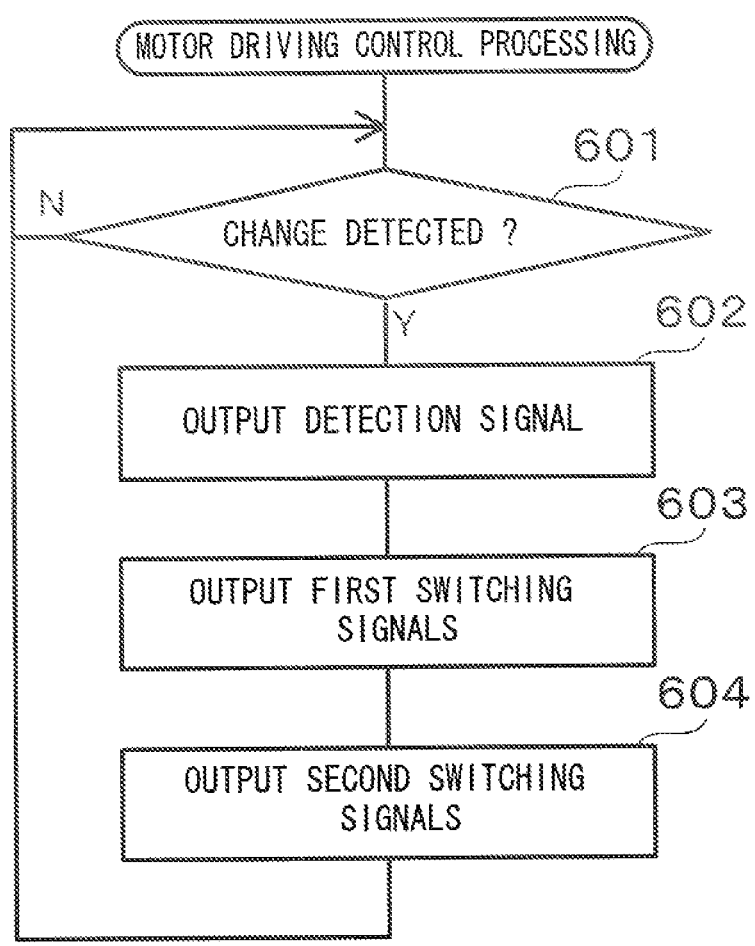
FIG. 6 is a flowchart showing an example of operation of the semiconductor device in accordance with the exemplary embodiment.

Now, motor driving control operations in accordance with the exemplary embodiment of the semiconductor device 1 in FIG. 1 are described using FIG. 6. When, in accordance with the outputs of the Hall effect device 10b, the comparator (a) 5 detects that the turning position of the rotor provided at the motor 10 has changed to a predetermined turning angle (step 601), the comparator (a) 5 outputs a detection signal (high/low) (step 602).

When the detection signal (high/low) is outputted from the comparator (a) 5, the PWM 7 outputs switching signals (LAD0 and LAD1) in accordance with the detection signal (high/low) to the lower arm 13 to switch which end portion of the coil 10a is connected to the ground GND (step 603), and the comparator controller (a) 6 outputs switching signals (UAD0 and UAD1) in accordance with the detection signal (high/low), to switch which end portion of the coil 10a is connected to the driving power supply VDDH at the upper arm 12, to the NMOS transistors T3 and T4 corresponding to the third switching circuit of the present invention (step 604).

In the present exemplary embodiment, the comparator controller (a) 6 controls to turn the PMOS transistors T1 and T2 provided at the upper arm 12 on and off via the NMOS transistors T3 and T4.

The detection signals (high/low) outputted from the comparator (a) 5 are microcontroller outputs. Thus, according to the present exemplary embodiment, the motor 10 that is driven at 12.0 V DC may be controlled by the semiconductor device 1 that is a microcontroller driven at 5.0 V DC.

During the operation of the above-mentioned steps 601 to 604, if an overcurrent detection signal (high) is outputted from the comparator (b) 9 shown in FIG. 3, the emergency stop operation that has been described using FIG. 4 and FIG. 5 is carried out, the two end portions M+ and M− of the coil 10a are short-circuited, and a back electromotive force may be suppressed by current remaining in the coil 10a being regenerated.

As has been described hereabove using the drawings, in the driving mechanism 20 or 20a equipped with the semiconductor device 1 or 1a according to the present exemplary embodiments, driving of the motor 10 that is driven at 12.0 V DC may be controlled by the semiconductor device 1 or 1a with a one-chip microcontroller structure that is driven at 5.0 V DC.

Furthermore, if an overcurrent flows in the motor 10, the overcurrent detection signal (high) is outputted from the comparator (b) 9, the emergency stop operation is carried out, and the two end portions M+ and M− of the coil 10a are short-circuited. Thus, the current remaining in the coil 10a may be regenerated and a back electromotive force suppressed without a time lag, and damage to components from the back electromotive force may be avoided.

The present invention is not limited to the exemplary embodiments described using the drawings, and numerous modifications are possible within a technical scope not departing from the spirit of the invention. For example, in the present exemplary embodiments, the semiconductor device 1 or 1a is driven at 5.0 V DC and the motor 10 that is the control target is driven at 12 V DC. However, the semiconductor device 1 or 1a may be driven at 3.3 V DC and the motor 10 may be driven at 24 V DC. Further, the motor 10 is a single-phase brushless motor in the present exemplary embodiments, but the present invention is also applicable to three-phase brushless motors and so forth.

In recent years, with the objective of saving electric power at microcontrollers, progress has been made in reducing voltages. Thus, there is a need, just with a microcontroller with a low driving voltage, to efficiently control a motor with a high driving voltage, and to detect an overcurrent in a motor and efficiently stop the motor.

In the aforementioned JP-A No. 2002-165476, switching elements of driving circuits (an upper arm and a lower arm) are controlled and turning of a motor is controlled with just a microcontroller and a position detection circuit. However, in JP-A No. 2002-165476, position detection signals outputted from a position detection signal generation circuit are converted to digital signals by an A/D converter, after which the position of a rotor of the motor is calculated using the digital signals by arithmetic processing at a CPU. Therefore, it takes time to detect the turning position of the motor, and a high-performance microcontroller that is capable of high-speed arithmetic processing is required to control a motor with a high rate of rotation. In addition, because the area of an A/D converter circuit is large, this technology is not preferable in regard to reducing circuit area.

Further, in a conventional technology that detects an overcurrent in a motor and stops turning of the motor just with a microcontroller, processing of an interrupt from a comparator that detects the current must be processed in software by a CPU. Therefore, there is a time lag, a back electromotive force may not be suppressed immediately, and there is a danger of damage to components from the back electromotive force.

In the technology recited in JP-A No. 2003-335456, when a current change is a large reversal or the like, a change in current value relative to a target current value is suppressed. Thus, an overcurrent in the motor is not detected and turning of the motor is not stopped immediately.

According to the present invention, driving of a motor may be efficiently controlled using a microcontroller with a lower driving voltage than the motor.

What is claimed is:
1. A semiconductor device that controls a motor driving device,
the motor driving device including:
a first switching circuit configured to switch which of end portions of a coil provided at a motor is connected to ground;
a second switching circuit connected to a first driving power supply and configured to switch which of the end portions of the coil is connected to the first driving power supply; and
a third switching circuit connected to the first driving power supply via a resistor, and
the semiconductor device comprising
a position detection section configured to detect changes in a turning position of a rotor of the motor responsive to position detection signals provided from the motor and output detection signals corresponding to the changing turning position;
a first switching section that is configured, in accordance with the detection signals, to output ground switching signals, which switch which end portion of the coil is connected to ground, to the first switching circuit; and
a second switching section that is configured, in accordance with the detection signals, to output connection switching signals to the third switching circuit,
wherein the second switching circuit is configured to switch connections between the end portions of the coil and the first driving power supply responsive to power supply switching signals at a connection node between the resistor and the third switching circuit, and
wherein the semiconductor device which controls the third switching circuit is connected to a second driving power supply, and a voltage of the second driving power supply is lower than a voltage of the first driving power supply,
wherein the first switching circuit comprises a first ground switching circuit that is configured, when a first ground switching signal from among the ground switching signals for switching a direction of current flowing in the coil of the motor to a first direction is inputted, to switch a first end portion of the coil from being connected to the first driving power supply to ground, the first ground switching circuit comprising a first MOS transistor,
the second switching circuit comprises a first power supply switching circuit that is configured, when a first power supply switching signal from among the power supply switching signals that is for switching the direction of the current flowing in the coil of the motor to a first direction is inputted, to switch the first end portion from being connected to ground to the first driving power supply, the first power supply switching circuit comprising a second MOS transistor, and
the third switching circuit comprises a first signal input circuit configured to provide the first power supply switching signal to the first power supply switching circuit, the first signal input circuit comprising a third MOS transistor, and
wherein a drain terminal of the third MOS transistor is connected to a gate terminal of the second MOS transistor and a first end of the resistor, a source terminal of the third MOS transistor is connected to a source terminal of the first MOS transistor and to ground, and a gate terminal of the third MOS transistor is connected to a first connection switching signal from among the connection switching signals output from the second switching section, and
the second switching section is connected to receive the detection signals from the position detection section, and the second switching section is configured to output the connection switching signals further responsive to a state of the first switching section.
2. The semiconductor device of claim 1, wherein
the first switching circuit further comprises a second ground switching circuit that is configured, when a second ground switching signal from among the ground switching signals for switching the direction of the current to a second direction, which is opposite to the first direction, is inputted, to switch a second end portion of the coil from being connected to the first driving power supply to ground, the second switching circuit further comprises a second power supply switching circuit that is configured, when a second power supply switching signal from among the power supply switching signals that is for switching the direction of the current to the second direction opposite to the first direction is inputted, to switch the second end portion from being connected to ground to the first driving power supply, and the third switching circuit further comprises a second signal input circuit configured to provide the second power supply switching signal to the second power supply switching circuit, and wherein the motor driving device, by alternatingly performing switching to switch a connection state of the first end portion from the first driving power supply to ground and switch a connection state of the second end portion from ground to the first driving power supply, and performing switching to switch the connection state of the first end portion from ground to the first driving power supply and switch the connection state of the second end portion from the first driving power supply to ground, switches the direction of the current flowing in the coil and drives the motor, the first switching section configured to detect changes in the turning position of the motor, input the first ground switching signal to the first ground switching circuit in accordance with a first detection signal from among the detection signals, which corresponds to a change of the current flowing in the coil to the first direction, such that the current flowing in the coil flows in the first direction, and input the second ground switching signal to the second ground switching circuit in accordance with a second detection signal from among the detection signals, which corresponds to a change to the second direction, such that the current flowing in the coil flows in the second direction, and the second switching section configured to input the first connection switching signal from among the connection switching signals to the first signal input circuit in accordance with the first detection signal such that the current flowing in the coil flows in the first direction, and input a second connection switching signal from among the connection switching signals to the second signal input circuit in accordance with the second detection signal such that the current flowing in the coil flows in the second direction.

3. The semiconductor device of claim 2, wherein the second ground switching circuit comprises a fourth MOS transistor, the second power supply switching circuit comprises a fifth MOS transistor, and the second signal input circuit comprises a sixth MOS transistor, wherein a drain terminal of the sixth MOS transistor is connected to a gate terminal of the fifth MOS transistor and the first end of the resistor, a source terminal of the sixth MOS transistor is connected to a source terminal of the fourth MOS transistor and to ground, and a gate terminal of the sixth MOS transistor is connected to the second connection switching signal from among the connection switching signals output from the second switching section.

4. The semiconductor device of claim 1, wherein the output of the ground switching signals by the first switching section and the output of the connection switching signals by the second switching section are delayed by pre-specified durations from the output of the detection signals.

5. The semiconductor device of claim 1, wherein
the output of the ground switching signals by the first switching section is delayed by a pre-specified duration from the input of the detection signals, and
the second switching section is configured to output the connection switching signals when the first switching section outputs the ground switching signals.

6. The semiconductor device of claim 1, wherein the first switching section is configured to output pulse width modulation (PWM) signals as the ground switching signals.

7. The semiconductor device of claim 1, further comprising:
an overcurrent detection section configured to output an overcurrent detection signal when the current flowing in the motor exceeds a pre-specified value; and
an emergency stop section that is configured, in accordance with the overcurrent detection signal outputted from the overcurrent detection section, to short-circuit the two ends of the coil.

8. The semiconductor device of claim 7, wherein the emergency stop section is configured to output a cut-off signal, which controls the first switching circuit to cut off the connection between ground and the coil, to the first switching section, and to output a short-circuit signal, which controls the second switching circuit to connect the two ends of the coil to the first driving power supply and short-circuit the two ends, to the second switching section.

9. The semiconductor device of claim 7, wherein the emergency stop section is configured to output a cut-off signal, which controls the second switching circuit to cut off the connection between the first driving power supply and the coil, to the second switching section, and to output a short-circuit signal, which controls the first switching circuit to connect the two ends of the coil to ground and short-circuit the two ends, to the first switching section.

10. The semiconductor device of claim 1, wherein the motor is a brushless motor.

11. The semiconductor device of claim 1, wherein the first switching section is configured to output pulse width modulation (PWM) signals as the ground switching signals based on the detection signals from the position detection section, and
when the first switching section is operable to output the PWM signals, the second switching circuit is configured to switch the connection switching signals so that one of the connection switching signals is switched to become high, and
when the first switching section is not operable to output the PWM signals, the second switching circuit is configured to switch the connection switching signals to both be low regardless of the detection signals.

12. A driving mechanism comprising:
a semiconductor device;
a motor driving device including
a first switching circuit configured to switch which of end portions of a coil provided at a motor is connected to ground, and
a second switching circuit connected to a first driving power supply and configured to switch which of the end portions of the coil is connected to the first driving power supply, the motor driving device configured to control current flowing in the coil with the first switching circuit and the second switching circuit;

a third switching circuit connected to the first driving power supply via a resistor; and the motor, wherein the semiconductor device is configured to control the motor driving device, and the semiconductor device includes a position detection section configured to detect changes in a turning position of a rotor of the motor responsive to position detection signals provided from the motor and output detection signals corresponding to the changing turning position;

a first switching section that is configured, in accordance with the detection signals, to output ground switching signals, which switch which end portion of the coil is connected to ground, to the first switching circuit; and a second switching section that is configured, in accordance with the detection signals, to output connection switching signals to the third switching circuit, wherein the second switching circuit is configured to switch connections between the end portions of the coil and the first driving power supply responsive to power supply switching signals at a connection node between the resistor and the third switching circuit, and wherein the semiconductor device which controls the third switching circuit is connected to a second driving power supply, and a voltage of the second driving power supply is lower than a voltage of the first driving power supply, wherein the first switching circuit comprises at least one first MOS transistor, the second switching circuit comprises at least one second MOS transistor, and the third switching circuit comprises at least one third MOS transistor, wherein the first MOS transistor is configured, when a first ground switching signal from among the ground switching signals for switching a direction of current flowing in the coil of the motor to a first direction is inputted, to switch a first end portion of the coil from being connected to the first driving power supply to ground, the second MOS transistor is configured, when a first power supply switching signal from among the power supply switching signals that is for switching the direction of the current flowing in the coil of the motor to a first direction is inputted, to switch the first end portion from being connected to ground to the first driving power supply, and the third MOS transistor is configured to provide the first power supply switching signal to the connection node, and wherein a drain terminal of the third MOS transistor is connected to a gate terminal of the second MOS transistor and a first end of the resistor, a source terminal of the third MOS transistor is connected to a source terminal of the first MOS transistor and to ground, and a gate terminal of the third MOS transistor is connected to a first connection switching signal from among the connection switching signals output from the second switching section, and the second switching section is connected to receive the detection signals from the position detection section, and the second switching section is configured to output the connection switching signals further responsive to a state of the first switching section.

13. A motor driving control method for a semiconductor device that controls a motor driving device, the motor driving device including a first switching circuit that switches which of end portions of a coil provided at a motor is connected to ground, the first switching circuit comprising a first MOS transistor; and a second switching circuit connected to a first driving power supply and that switches which of the end portions of the coil is connected to the first driving power supply, the second switching circuit comprising a second MOS transistor, the motor driving device controlling current flowing in the coil with the first switching circuit and the second switching circuit, and a third switching circuit connected to the first driving power supply via a resistor, the third switching circuit comprising a third MOS transistor, wherein the second switching circuit switches connections between the end portions of the coil and the first driving power supply responsive to power supply switching signals at a connection node between the resistor and the third switching circuit, wherein the semiconductor device which controls the third switching circuit is connected to a second driving power supply, and a voltage of the second driving power supply is lower than a voltage of the first driving power supply, and wherein a drain terminal of the third MOS transistor is connected to a gate terminal of the second MOS transistor and a first end of the resistor, a source terminal of the third MOS transistor is connected to a source terminal of the first MOS transistor and to ground, and a gate terminal of the third MOS transistor is connected to a first connection switching signal from among the connection switching signals, the motor driving control method for the semiconductor device comprising:

detecting changes in a turning position of a rotor of the motor responsive to position detection signals provided from the motor and outputting detection signals corresponding to the changing turning position;

outputting ground switching signals, which switch which end portion of the coil is connected to ground, to the first switching circuit, in accordance with the detection signals; and outputting connection switching signals to the third switching circuit, in accordance with the detection signals and a state of the first switching circuit.

* * * * *